(12) United States Patent
Webber et al.

(10) Patent No.: US 11,686,189 B2
(45) Date of Patent: *Jun. 27, 2023

(54) APPARATUS AND METHODS FOR REGULATING FLOW FROM A GEOLOGICAL FORMATION

(71) Applicant: FORUM US, INC., Houston, TX (US)

(72) Inventors: Andrew Webber, Hockley, TX (US); Alfredo Vazquez, Houston, TX (US); Wrom Demn Olalla, Sugar Land, TX (US)

(73) Assignee: Forum US, Inc., Houston, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/322,544

(22) Filed: May 17, 2021

(65) Prior Publication Data

US 2022/0003104 A1 Jan. 6, 2022

Related U.S. Application Data

(63) Continuation of application No. 16/678,925, filed on Nov. 8, 2019, now Pat. No. 11,008,848.

(51) Int. Cl.
*E21B 43/38* (2006.01)
*E21B 34/06* (2006.01)
*E21B 43/12* (2006.01)

(52) U.S. Cl.
CPC .............. *E21B 43/38* (2013.01); *E21B 34/06* (2013.01); *E21B 43/121* (2013.01)

(58) Field of Classification Search
CPC .......... E21B 43/38; E21B 43/35; E21B 43/12; E21B 43/121; E21B 43/13; E21B 34/06
See application file for complete search history.

(56) References Cited

U.S. PATENT DOCUMENTS

| 4,135,861 A | 1/1979 | Brown et al. |
| 4,605,069 A | 8/1986 | McClaflin et al. |
| 4,664,603 A | 5/1987 | Priestly |

(Continued)

FOREIGN PATENT DOCUMENTS

| WO | 2015038331 A1 | 3/2015 |
| WO | 2019018781 A1 | 1/2019 |

OTHER PUBLICATIONS

Non-Final Office Action dated Mar. 5, 2020 for U.S. Appl. No. 16/041,340.

(Continued)

*Primary Examiner* — Kristyn A Hall
(74) *Attorney, Agent, or Firm* — Patterson + Sheridan, LLP

(57) ABSTRACT

Aspects of the present disclosure relate to apparatus and methods for regulating flow from a geological formation, and associated components thereof. In one implementation, an apparatus for regulating a multi-phase fluid stream flowing from a subterranean geological formation includes a conduit. The conduit includes an outer wall, a primary flow path for a fluid stream, and a first restriction having a throat portion. A first return path includes a return channel, and the return channel is fluidly connected to the primary flow path through a return inlet and a return outlet. The apparatus includes a gas siphon port formed in the outer wall of the conduit, and a gas siphon path extending from the conduit. The gas siphon path is fluidly connected to the gas siphon port.

21 Claims, 6 Drawing Sheets

(56) References Cited

U.S. PATENT DOCUMENTS

| | | | |
|---|---|---|---|
| 4,744,730 A | 5/1988 | Roeder | |
| 5,472,054 A | 12/1995 | Hinds | |
| 5,806,599 A | 9/1998 | Hisaw et al. | |
| 5,934,372 A | 8/1999 | Muth | |
| 6,053,261 A | 4/2000 | Walter | |
| 6,394,183 B1 | 5/2002 | Schrenkel et al. | |
| 9,297,239 B2 | 3/2016 | Lopez Robayo | |
| 11,008,848 B1* | 5/2021 | Webber | E21B 43/38 |
| 2005/0045337 A1 | 3/2005 | Bansal et al. | |
| 2005/0051340 A1 | 3/2005 | Williams | |
| 2006/0213652 A1 | 9/2006 | Shaposhnikov et al. | |
| 2009/0120638 A1* | 5/2009 | Shaw | E21B 43/128 166/265 |
| 2010/0101798 A1 | 4/2010 | Simpson et al. | |
| 2012/0073820 A1 | 3/2012 | Rankin | |
| 2012/0132289 A1 | 5/2012 | Kolle | |
| 2012/0175127 A1 | 7/2012 | Yale et al. | |
| 2012/0273221 A1 | 11/2012 | Robayo | |
| 2012/0292047 A1 | 11/2012 | Knobloch, Jr. et al. | |
| 2015/0226046 A1 | 8/2015 | Wolf et al. | |
| 2016/0222773 A1 | 8/2016 | Sims et al. | |
| 2016/0258231 A1 | 9/2016 | Naumann et al. | |
| 2017/0247958 A1 | 8/2017 | Alfonzo Nunez et al. | |
| 2017/0268322 A1 | 9/2017 | Culbertson et al. | |
| 2018/0073327 A1 | 3/2018 | Theimer et al. | |
| 2019/0024491 A1* | 1/2019 | Fielder | E21B 43/38 |

OTHER PUBLICATIONS

Final Office Action dated Jun. 26, 2020 for U.S. Appl. No. 16/041,340.
Non-Final Office Action dated Oct. 7, 2020 for U.S. Appl. No. 16/041,340.
PCT International Search Report and Written Opinion dated Feb. 10, 2021, for International Application No. PCT/US2020/058168.
Final Office Action dated Feb. 1, 2021 for U.S. Appl. No. 16/041,340.
Non-Final Office Action dated May 5, 2021 for U.S. Appl. No. 16/041,340.

* cited by examiner

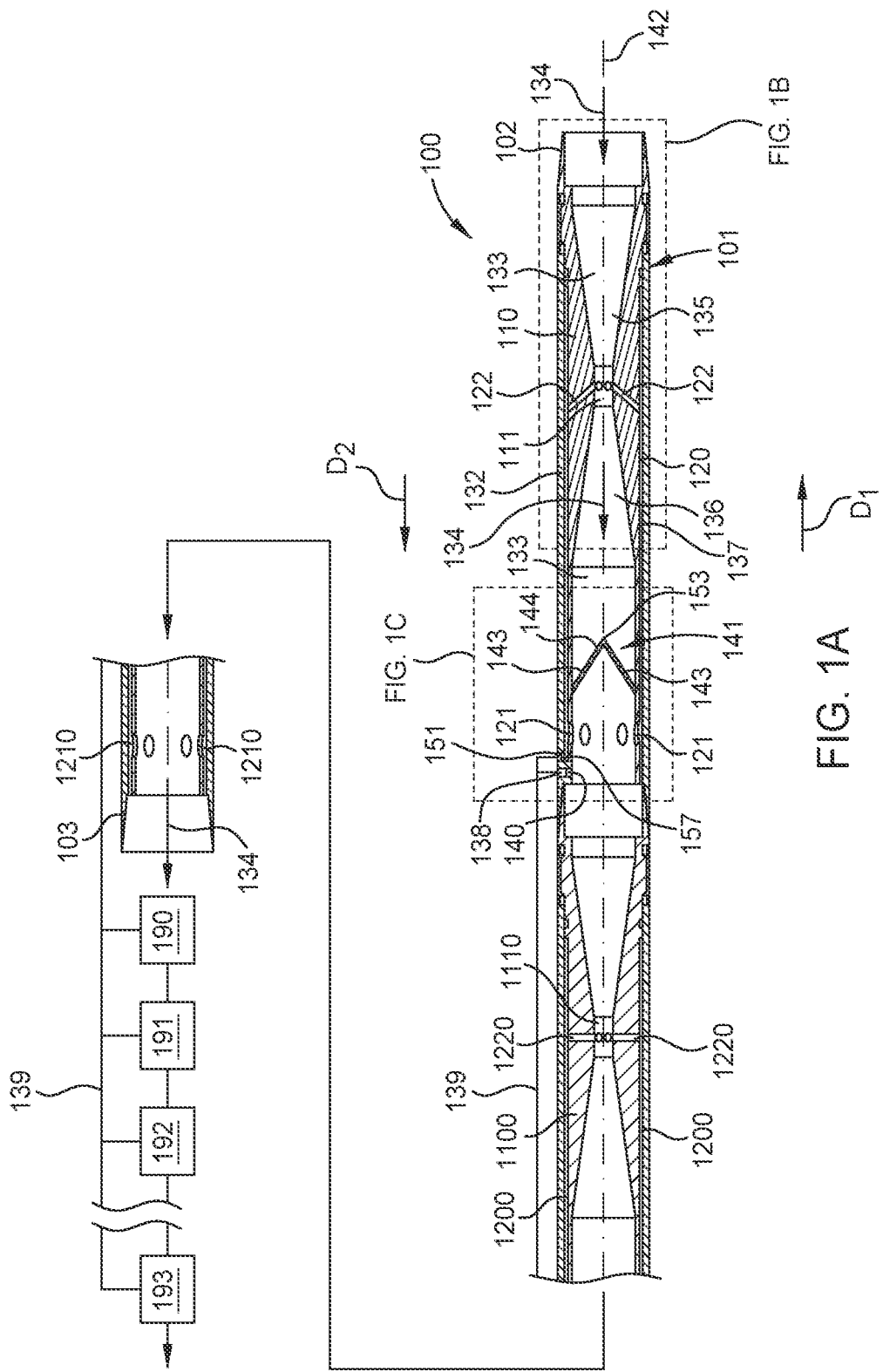

US 11,686,189 B2

APPARATUS AND METHODS FOR REGULATING FLOW FROM A GEOLOGICAL FORMATION

CROSS-REFERENCE TO RELATED APPLICATION

This application is a continuation of U.S. patent application Ser. No. 16/678,925, filed Nov. 8, 2019, which is herein incorporated by reference in its entirety.

BACKGROUND

Field

The disclosure relates to apparatus and methods for regulating flow from a geological formation.

Description of the Related Art

Oil and gas wells produce multi-phase fluid flow from subterranean formations, which may include gases, liquids, and/or solids. The prevalence of gas may impede production flow rates and/or hinder performance of production equipment. For example, a multi-phase fluid may have a high gas volume fraction that impedes production flow rates by causing a pump to gas lock. Gas may also build up and/or form pockets in regions of production equipment that impede production flow rates and/or hinder performance of production equipment.

Therefore, there is a need for apparatus for regulating flow from a geological formation to reduce a gas volume fraction and/or to facilitate reduction of gas build up and/or gas pockets formed in production equipment.

SUMMARY

Implementations of the present disclosure relate to apparatus and methods for regulating flow from a geological formation, and associated components thereof.

In one implementation, an apparatus for regulating a multi-phase fluid stream flowing from a subterranean geological formation includes a conduit. The conduit includes an outer wall, a primary flow path for a fluid stream, and a first restriction having a throat portion. The apparatus includes a first return path having a return inlet and a return outlet positioned upstream of the return inlet. The return outlet is disposed within the first restriction at the throat portion. The first return path includes a return channel, and the return channel is fluidly connected to the primary flow path through the return inlet and the return outlet. The apparatus includes a gas siphon port formed in the outer wall of the conduit, and a gas siphon path extending from the conduit. The gas siphon path is fluidly connected to the gas siphon port.

In one implementation, an apparatus for regulating a multi-phase fluid stream flowing from a subterranean geological formation includes a conduit. The conduit includes an outer wall, a primary flow path for a fluid stream, a centerline axis, and a first restriction having a throat portion. The centerline axis defines a first reference plane that projects radially from the centerline axis. The apparatus includes a first return path. The first return path includes a return inlet, and a return outlet positioned upstream of the return inlet and disposed within the first restriction at the throat portion. The return outlet includes one or more ports disposed at a first angle relative to the first reference plane of the conduit. The first return path includes a return channel, and the return channel is fluidly connected to the primary flow path through the return inlet and the return outlet.

In one implementation, an apparatus for regulating a multi-phase fluid stream flowing from a subterranean geological formation includes a conduit. The conduit includes an outer wall, a primary flow path for a fluid stream, a centerline axis, and a first restriction having a throat portion. The apparatus includes a first return path. The first return path includes a return inlet, and a return outlet positioned upstream of the return inlet and disposed within the first restriction at the throat portion. The first return path includes a return channel, and the return channel is fluidly connected to the primary flow path through the return inlet and the return outlet. The apparatus includes a diverter positioned in the primary flow path and upstream of the return inlet to direct at least a portion of the fluid stream radially outward relative to the centerline axis.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1A is a schematic illustration of a regulator apparatus for regulating a multi-phase fluid stream flowing from a subterranean geological formation, according to one implementation.

Figure 1B:
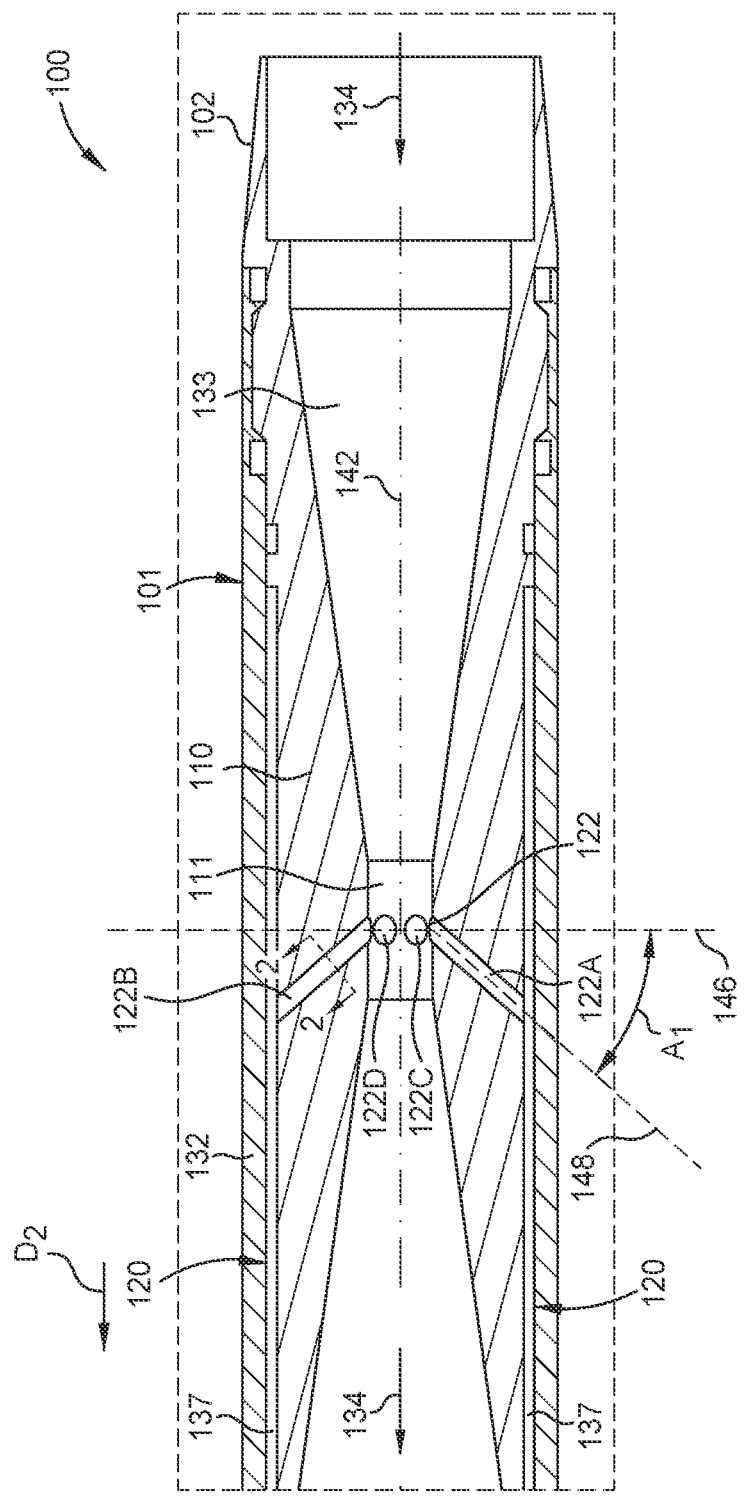
FIG. 1B illustrates an enlarged schematic view of a portion of the regulator apparatus illustrated in FIG. 1A, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to apparatus and methods for regulating flow from a geological formation, and associated components thereof.

FIG. 1A is a schematic illustration of a regulator apparatus 100 for regulating a multi-phase fluid stream flowing from a subterranean geological formation, according to one implementation. The regulator apparatus 100 includes a conduit 101, such as piping or tubing. The conduit 101 includes an outer wall 132 and a primary flow path 133 for flowing a fluid stream 134 therethrough. The fluid stream 134 is multi-phase and has two or more of liquids, gases, and/or solids.

The regulator apparatus 100 includes an upstream end portion 102 and a downstream end portion 103 adapted to permit attachment (e.g., by threaded attachment) to other equipment, such as production equipment. The conduit 101 includes a first restriction 110 having a throat portion 111. The first restriction 110 restricts the primary flow path 133. In one example, the first restriction 110 is a nozzle, such as a Venturi nozzle or a convergent-divergent nozzle. The first restriction 110 may be an orifice plate, or can be configured to telescope into a body assembly with a spring counter balance used to maintain a regulated pressure drop and velocity regulation.

The first restriction 110 includes a converging portion 135 and a diverging portion 136 disposed downstream from the converging portion 135. The throat portion 111 is disposed between the converging portion 135 and the diverging portion 136. The conduit 101 includes a first return path 120. The first return path includes a return inlet 121 positioned downstream of the first restriction 110, and a return outlet 122 positioned upstream of the return inlet 121 of the first return path 120. The first return path 120 includes a return channel 137, such as an annular return channel, that is fluidly connected to the primary flow path 133 through the return inlet 121 and the return outlet 122.

The first restriction 110 and the first return path 120 are sized and configured to permit at least a portion of the fluid stream 134, such as a gas portion, to flow from the return inlet 121 to the return outlet 122 of the first return path 120. When the fluid stream 134 flows through the first restriction 110, a low pressure zone is generated, relative to the pressure of the fluid stream 134 upstream of the throat portion 111, and downstream of the throat portion 111. The low pressure zone is located at or near the throat portion 111 of the first restriction 110. In one example, the return outlet 122 of the first return path 120 is positioned at or near the throat portion 111 of the first restriction 110. As the fluid stream 134 flows through the regulator apparatus 100, the low pressure zone creates a pressure differential between the fluid stream 134 at the return inlet 121 of the return path 120 and the fluid stream 134 at the return outlet 122 of the first return path 120 so as to cause at least a portion of the fluid stream 134 to flow from the return inlet 121 to the return outlet 122 of the first return path 120, and into the low pressure zone at or near the throat portion 111 of the first restriction 110.

The first restriction 110 can compress a gas portion of the fluid stream 134 as it flows through the low pressure zone produced at or near the throat portion 111 of the first restriction 110. The velocity of the fluid stream 134 can be at its highest in the regulator apparatus 100 at the low pressure zone thereby producing a mixing region within the regulator apparatus 100 where the portion of the fluid stream 134 flowing through the first return path 120 enters the low pressure zone and mixes with portions of the fluid stream 134 flowing through the first restriction 110. When the portion of the fluid stream 134 flowing through the first return path 120 has a lower gas volume fraction than that of the fluid stream 134 entering the first restriction 110, the gas volume fraction of the fluid stream 134 flowing from the regulator apparatus 100 is reduced as compared to a gas volume fraction of the fluid stream 134 upstream of the first restriction 110. For example, slug flow can be reduced. In this manner, the gas volume fraction of the fluid stream 134 flowing from the regulator apparatus 100 is reduced to an amount that prevents or reduces the probability that a pump positioned downstream of the regulator apparatus 100 will gas lock. In one example, the gas volume fraction of the fluid stream 134 flowing downstream of the regulator apparatus 100 is less than or equal to about 0.40, such as less than or equal to about 0.30. After flowing through the regulator apparatus 100, the fluid stream 134 flows towards a pump 190, such as an electric submersible pump (ESP) and/or a rod pump. The fluid stream 134 may flow past other equipment prior to reaching the pump 190.

The regulator apparatus 100 can also include one or more additional return paths, which can be sized, configured, and operated in the same or similar fashion as the first return path 120 described above. The one or more additional return paths can include one or more of the same aspects, components, features, and/or properties as the first return path 120. In one example, the conduit 101 of the regulator apparatus 100 includes at least a second return path including a return inlet positioned downstream of the first restriction 110, and a return outlet positioned upstream of the return inlet of the second return path (e.g., at or near the throat portion 111 of the first restriction 110).

The regulator apparatus 100 can also include one or more additional restrictions (one additional restriction is shown in FIG. 1A), which can be sized, configured, and operated in the same or similar fashion as the first restriction 110 described above. The one or more additional restrictions can include one or more of the same aspects, components, features, and/or properties as the first restriction 110. For example, the conduit 101 can include at least a second restriction 1100 positioned downstream of the first restriction 110. The conduit 101 can also include at least a second return path 1200 including a return inlet 1210 positioned downstream of the second restriction 1100, and a return outlet 1220 positioned upstream of the return inlet 1210 of the second return path. For example, the return outlet 1220 of the second return path 1200 can be positioned at or near, either the throat portion 111 of the first restriction 110 or a throat portion 1110 of the second restriction 1100, so as to cause a portion of the fluid stream 134 to flow from the return inlet 1210 to the return outlet 1220 of the second return path 1200.

The conduit 101 can include additional diverters, such as a second diverter positioned downstream from the second restriction 1100 and upstream from the return inlet 1210 of the second return path 1200, and/or a second gas siphon path and a second gas siphon port positioned downstream from the return inlet 1210. The second diverter, second gas siphon path, and second gas siphon port can include one or more of the same aspects, components, features, and/or properties as the diverter 141, the gas siphon path 139, and the gas siphon port 138, respectively. The return inlet 1210 and the return outlet 1220 of the second return path 1200 can include one or more of the same aspects, components, features, and/or properties as the return inlet 121 and the return outlet 122 of the first return path 120, respectively.

In one embodiment, which can be combined with other embodiments, the first restriction 110 of the regulator apparatus 100 is sized and configured to have a flow area that is about 10% less than a flow area of the portion of the conduit 101 upstream of the first restriction 110. In a case where the regulator apparatus 100 comprises more than one restriction, the flow area for each additional restriction is preferably reduced by about an additional 10%. Thus, for example, in a regulator apparatus 100 having two or more restrictions positioned in series (as illustrated in FIG. 1A), the first restriction 110 has a flow area that is about 10% less than the flow area of the conduit upstream of the first restriction 110, and the second restriction 1100 has a flow area that is about 20% less than the flow area of the conduit upstream of the first restriction 110. In such a case, each restriction with a restriction preceding it should be positioned a distance from that preceding restriction of about 5 to 10 times greater than the inside diameter of the throat portion of the preceding restriction. For example, if the apparatus has two restrictions, the second restriction 1100 is positioned a distance that is about 5 to 10 times larger than the inside diameter of the throat portion of the first restriction 110. In one embodiment, which can be combined with other embodiments, the regulator apparatus 100 is disposed downhole and has an overall average diameter in the range of about 3.75 to about 5.62 inches. In one example, the regulator apparatus 100 has a length of about 20 feet.

The one or more return paths (such as the first return path 120) can include a pathway defined at least partially by a wall of the conduit 101 (such as the outer wall 132) of the regulator apparatus 100, an externally mounted capillary tube or piping conduit, or another device. In one example, each of the one or more return paths includes one or more openings formed in the conduit 101 of the regulator apparatus 100.

The regulator apparatus 100 includes a gas siphon port 138 formed in the outer wall 132 of the conduit 101, and a gas siphon path 139 that extends from the conduit 101. The gas siphon path 139 is fluidly connected to the primary flow path 133 of the conduit through the gas siphon port 138. The gas siphon path 139 includes one or more valves 140. The one or more valves 140 are disposed in the gas siphon port 138. The one or more valves may 140 include one or more of a check valve, a balanced check valve, a swing check valve, and/or combinations thereof. The gas siphon port 138 and the one or more valves 140 positioned therein interface with the primary flow path 133. The gas siphon port 138 is positioned downstream of the return inlet 121 of the first return path 120. The one or more valves 140 are movable between an open position and a closed position. In the open position a gas portion of the fluid stream 134 flows out of the primary flow path 133, through the one or more valves 140, through the gas siphon port 138, and through the gas siphon path 139. In the closed position, gas portions of the fluid stream 134 cannot flow from the primary flow path 133 and out through the one or more valves 140.

The gas siphon path 139 is fluidly connected to one or more pieces of equipment. In one example, the gas siphon path 139 is fluidly connected to an intake of the pump 190 that is positioned downstream of the conduit 101 and downstream of the subterranean geological formation from which the fluid stream 134 flows. At least part of the gas portion of the fluid stream 134 flows through the gas siphon path 139 and into the pump 190. The pump 190 is positioned downhole. In one example, the gas siphon path 139 is fluidly connected to a downhole compressor 191 such that at least part of the gas portion of the fluid stream 134 flows through the gas siphon path 139 and into the downhole compressor 191. In one example, the gas siphon path 139 is fluidly connected to a production annulus 192 between production tubing and a casing. In one example, the gas siphon path 139 is fluidly connected to one or more pieces of surface equipment 193, such as a pump jack. In one embodiment, which can be combined with other embodiments, the gas siphon path 139 bypasses the downhole pump 190.

In one example, the gas siphon path 139 includes a path defined by a casing in a wellbore, such as a path between the regulator apparatus 100 and a casing disposed in a wellbore.

In one example, the gas siphon path 139 includes flow equipment such as tubing, piping, and/or flow conduits.

The gas siphon path 139, gas siphon port 138, and the one or more valves 140 facilitate reducing buildup of gas, and/or formation of gas pockets, from the fluid stream 134 near the return inlet 121 of the first return path 120.

The regulator apparatus 100 includes a diverter 141 disposed in the primary flow path 133 of the conduit 101. The conduit includes a centerline axis 142. The diverter 141 is positioned upstream of the return inlet 121 of the first return path 120. In one example, the diverter 141 is positioned downstream of the diverging portion 136 of the first restriction 110. In one example, the diverter 141 is positioned within the first restriction 110, such as within the diverging portion 136. In one example, the return inlet 121 is positioned within the first restriction 110, such as within the diverging portion 136, and the diverter 141 is positioned upstream of the return inlet 121.

The diverter 141 is conical in shape. The diverter 141 may be vertically aligned with the return inlet 121 and/or positioned at least partially downstream of the return inlet 121. In one example, the diverter 141 is frustoconical in shape. The diverter includes an apex 153. The apex 153 may be flat, round, or pointed. The apex 153 points in an upstream direction $D_1$ from the return inlet 121 towards the return outlet 122 of the first return path 120. The diverter 141 includes one or more flow openings 143 formed in an outer surface 144 of the diverter 141. In one embodiment, which can be combined with other embodiments, the diverter 141 is coupled to an inner surface of the conduit 101.

The diverter 141 directs at least a portion of the fluid stream 134 radially outward relative to the centerline axis 142 of the conduit 101, such as in a direction towards the outer wall 132 of the conduit. At least a portion of the fluid stream 134 flows around the outer surface 144 of the diverter 141 and through the one or more flow openings 143. The diverter 141 facilitates mixing at or near the throat portion 111 by facilitating the flow of a gas portion of the fluid stream 134 into the return inlet 121 and the return outlet 122 of the first return path 120. Hence, the diverter 141 facilitates reducing the gas volume fraction of the fluid stream 134 after it flows out of the regulator apparatus 100. The diverter 141 facilitates mixing by directing radially outward portion(s) of the fluid stream 134, such as a gas portion, that tends to flow near the centerline axis 142 of the conduit 101.

FIG. 1B illustrates an enlarged schematic view of a portion of the regulator apparatus 100 illustrated in FIG. 1A, according to on implementation. The return outlet 122 of the first return path 120 includes one or more ports 122A-122D (four are shown) formed through the first restriction 110. The one or more ports 122A-122D fluidly connect the return channel 137 to the throat portion 111. The centerline axis 142 of the conduit 101 defines a first reference plane 146 that projects radially outward from the centerline axis 142. The one or more ports 122A-122D are disposed at a first angle $A_1$ relative to the first reference plane 146. The one or more ports 122A-122D are disposed at the first angle $A_1$ relative to the first reference plane 146 of the conduit 101 such that a centerline axis 148 of each of the one or more ports 122A-122D intersects the first reference plane 146 to form the first angle $A_1$. In one embodiment, which can be combined with other embodiments, the first angle $A_1$ is within a range of 0 degrees to 10 degrees. In such an embodiment, the centerline axis 148 of each of the ports 122A-122D is perpendicular to the centerline axis 142 of the conduit 101 to facilitate spinning fluid around the centerline axis 142 of the conduit as the fluid is introduced at or near the throat portion 111 of the first restriction 110 from the return outlet 122 of the first return path 120 and into the primary flow path 133. In one example, the first angle $A_1$ is about 0 degrees and the centerline axis 148 is within the first reference plane 146. In one embodiment, which can be combined with other embodiments, the first angle $A_1$ is within a range of 30 degrees to 80 degrees, such as 30 degrees to 60 degrees. The first angle $A_1$ facilitates mixing fluid (such as a gas portion of the fluid stream 134) from the first return path 120 with the fluid stream 134 flowing through the conduit 101.

Figure 1C:
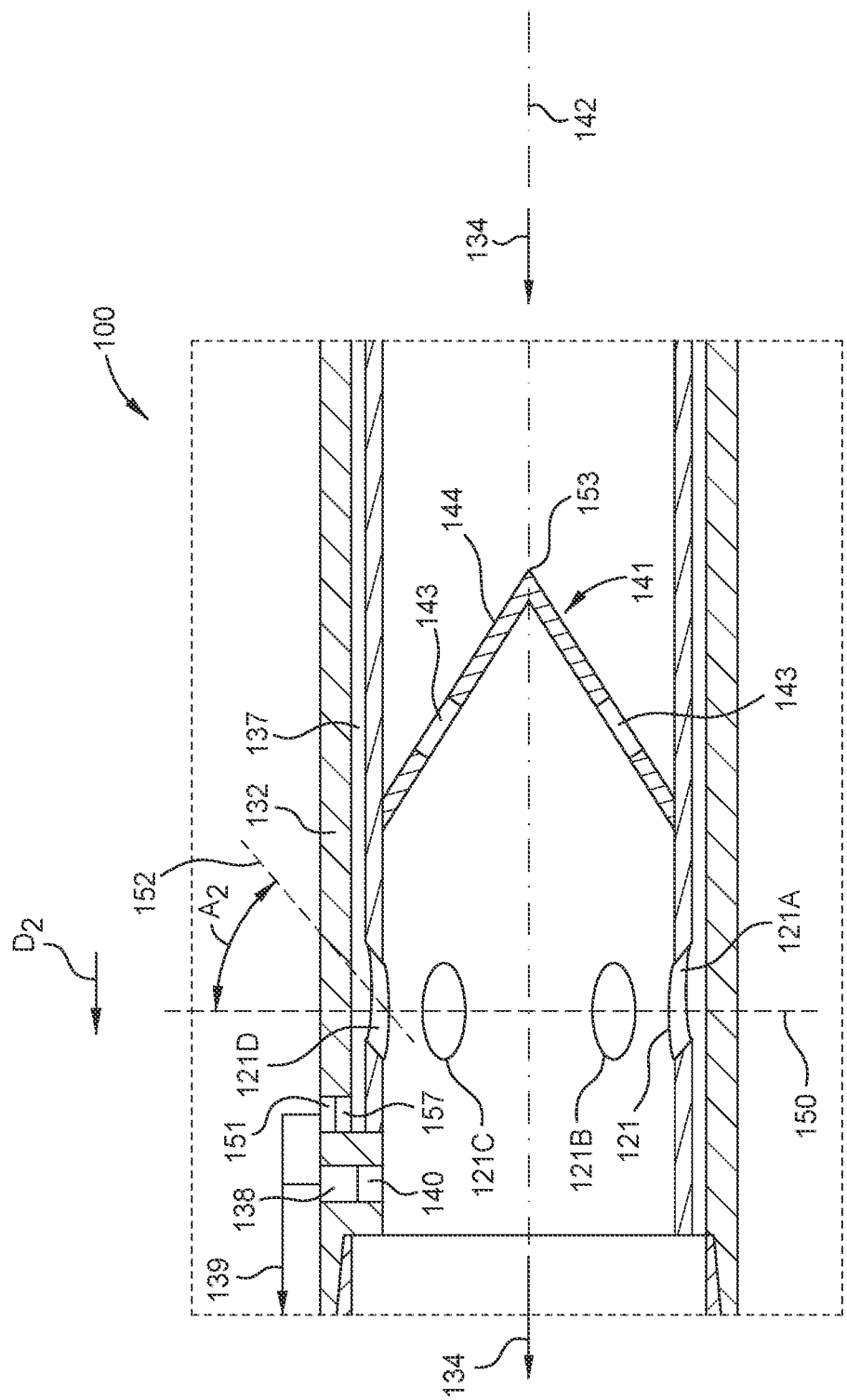
FIG. 1C illustrates an enlarged schematic view of a portion of the regulator apparatus illustrated in FIG. 1A, according to one implementation.

FIG. 1C illustrates an enlarged schematic view of a portion of the regulator apparatus 100 illustrated in FIG. 1A, according to one implementation. The regulator apparatus 100 includes the gas siphon port 138 formed in the outer wall 132 of the conduit 101. The one or more valves 140 are disposed in the gas siphon port 138. The one or more valves 140 and the gas siphon port 138 are disposed downstream from the return inlet 121 of the first return path 120.

The regulator apparatus 100 includes a gas siphon port 151 formed in the outer wall 132 of the conduit 101 and positioned radially outside of the return channel 137. The gas siphon path 139 is fluidly connected to the gas siphon port 151 positioned outside of the return channel 137. The gas siphon path 139 is fluidly connected to the return channel 137 of the conduit through the gas siphon port 151. The gas siphon path 151 includes one or more valves 157. The one or more valves 157 are disposed in the gas siphon port 151. The one or more valves may 157 include one or more of a check valve, a balanced check valve, a swing check valve, and/or combinations thereof. The gas siphon port 151 and the one or more valves 157 disposed therein interface with the return channel 137. The gas siphon port 151 is positioned downstream of the return inlet 121 of the first return path 120. The gas siphon port 151 may be positioned upstream of the return inlet 121 of the first return path 120. The one or more valves 157 are movable between an open position and a closed position. In the open position a gas portion of a fluid stream in the return channel 137 flows out of the return channel 137, through the one or more valves 157, through the gas siphon port 151, and through the gas siphon path 139. In the closed position, gas portions of the fluid stream in the return channel 137 cannot flow from the return channel and out through the one or more valves 157.

The gas siphon path 139, gas siphon port 151, and the one or more valves 157 facilitate reducing buildup of gas, and/or formation of gas pockets, from the fluid stream 134 near the return inlet 121 of the first return path 120.

The return inlet 121 includes one or more ports 121A-121D (four are shown). The centerline axis 142 of the conduit 101 defines a second reference plane 150 that projects radially outward from the centerline axis 142. The one or more ports 121A-121D are disposed at a second angle $A_2$ relative to the second reference plane 150. The one or more ports 121A-121D are disposed at the second angle $A_2$ relative to the second reference plane 150 of the conduit 101 such that a centerline axis 152 of each of the one or more ports 121A-121D intersects the second reference plane 150 to form the second angle $A_2$. In one embodiment, which can be combined with other embodiments, the second angle $A_2$ is within a range of 30 degrees to 80 degrees. In one example, the second angle $A_2$ is within a range of 50 degrees to 80 degrees.

In one embodiment, which can be combined with other embodiments, the one or more ports 122A-122D of the return outlet 122 angle radially outwards relative to the centerline axis 142 in a downstream direction $D_2$ from the return outlet 122 to the return inlet 121 (as illustrated in FIG. 1B). In one embodiment, which can be combined with other embodiments, the one or more ports 121A-121D of the return inlet 121 angle radially inwards relative to the centerline axis 142 in the downstream direction $D_2$ from the return outlet 122 to the return inlet 121 (as illustrated in FIG. 1C).

Figure 1D:
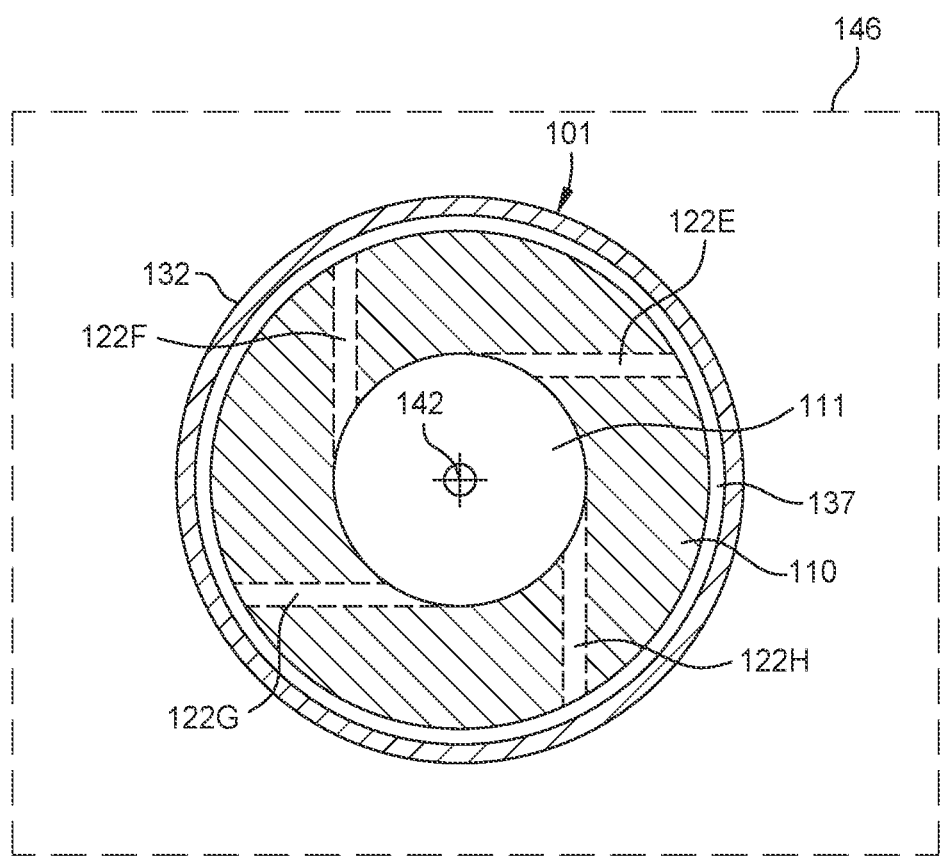
FIG. 1D illustrates a schematic cross sectional view, taken along the first reference plane, of the regulator apparatus illustrated in FIG. 1B, according to one implementation.

FIG. 1D illustrates a schematic cross sectional view, taken along the first reference plane 146, of the regulator apparatus 100 illustrated in FIG. 1B, according to one implementation. Instead of the ports 122A-122D, the return inlet 122 includes one or more ports 122E-122H. The ports 122E-122H are similar to the ports 122A-122D and may include one or more of the aspects, features, components, and/or properties thereof. Each of the ports 122E-122H is disposed tangentially to the centerline axis 142 of the conduit 101 in the first reference plane 146. Each of the ports 122E-122H intersects the throat portion 111 tangentially to the centerline axis 142 in the first reference plane 146. A centerline axis of each port 122E-122H is disposed tangentially to the centerline axis 142 of the conduit 101 such that the centerline axis of each port 122E-122H does not intersect the centerline axis 142 of the conduit 101. The tangential configuration of the ports 122E-122H facilitates spinning fluid around the centerline axis 142 of the conduit as the fluid is introduced at or near the throat portion 111 of the first restriction 110 from the return outlet 122 of the first return path 120 and into the primary flow path 133.

Figure 2:
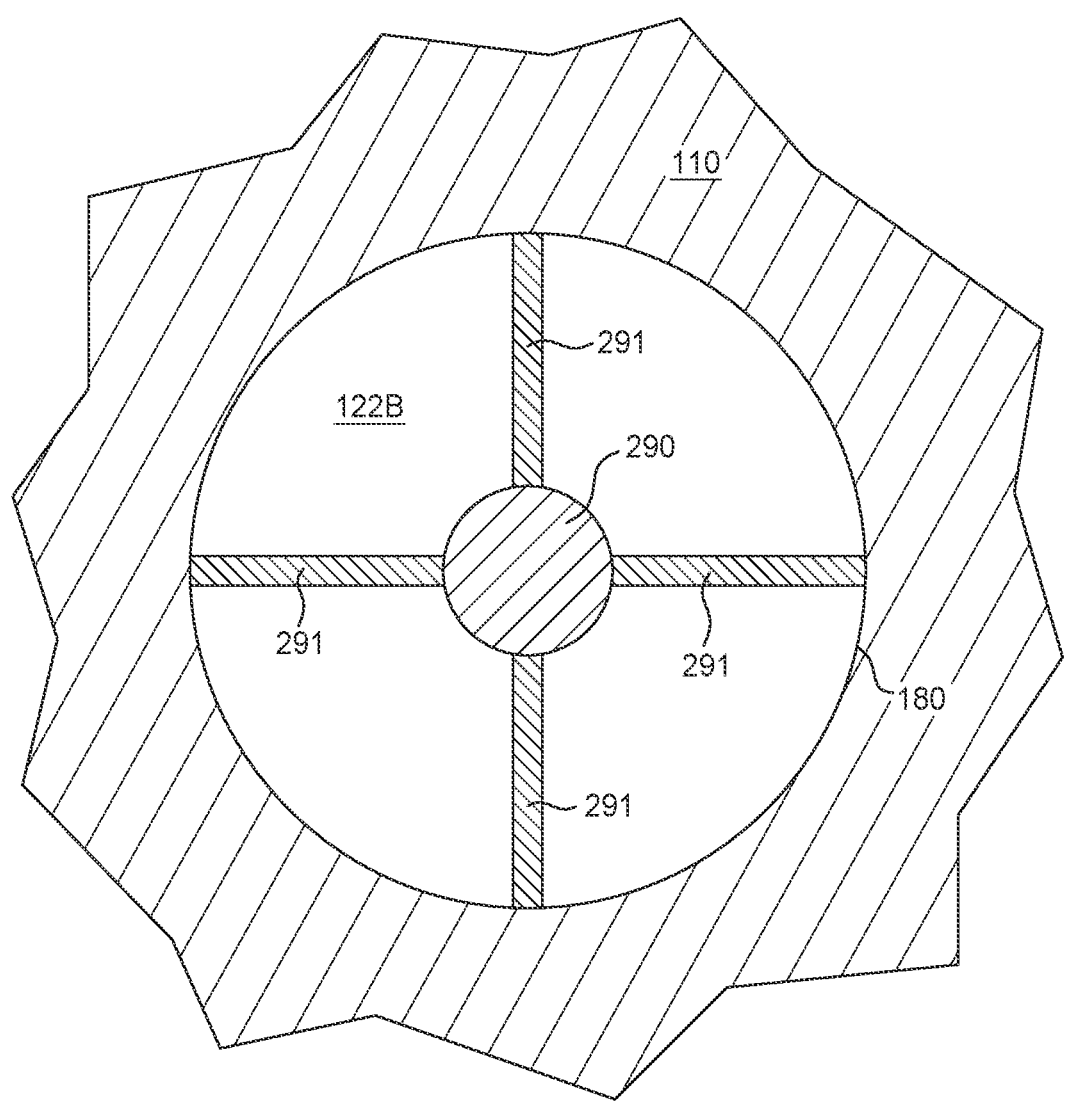
FIG. 2 illustrates a schematic cross-sectional view of a port, taken along section line 2-2, illustrated in FIG. 1B, according to one implementation.

FIG. 2 illustrates a schematic cross-sectional view of the port 122B, taken along section 2-2, illustrated in FIG. 1B. The present disclosure contemplates that each of the one or more ports 122A-122D of the return outlet 122 may include one or more of the aspects, features, components, and/or properties described for the port 122B. The port 122B comprises one or more return path restrictions 290 disposed in the port 122B. The return path restriction 290 is circular and occupies at least part of the port 122B, such as the center of the port 122B. Each of the one or more return path restrictions 290 includes one or more projections (such as lobes or fins) that extend from the one or more return path restrictions 290. The return path restriction 290 includes one or more projections 291 (four are shown) that extend radially from the one or more return path restrictions 290. The projections 291 interface with an inner surface 180 of the port 122B. Each of the one or more projections 291 couples to the return path restriction 290 at a first end and couples to the inner surface 180 at a second end.

Figure 3:
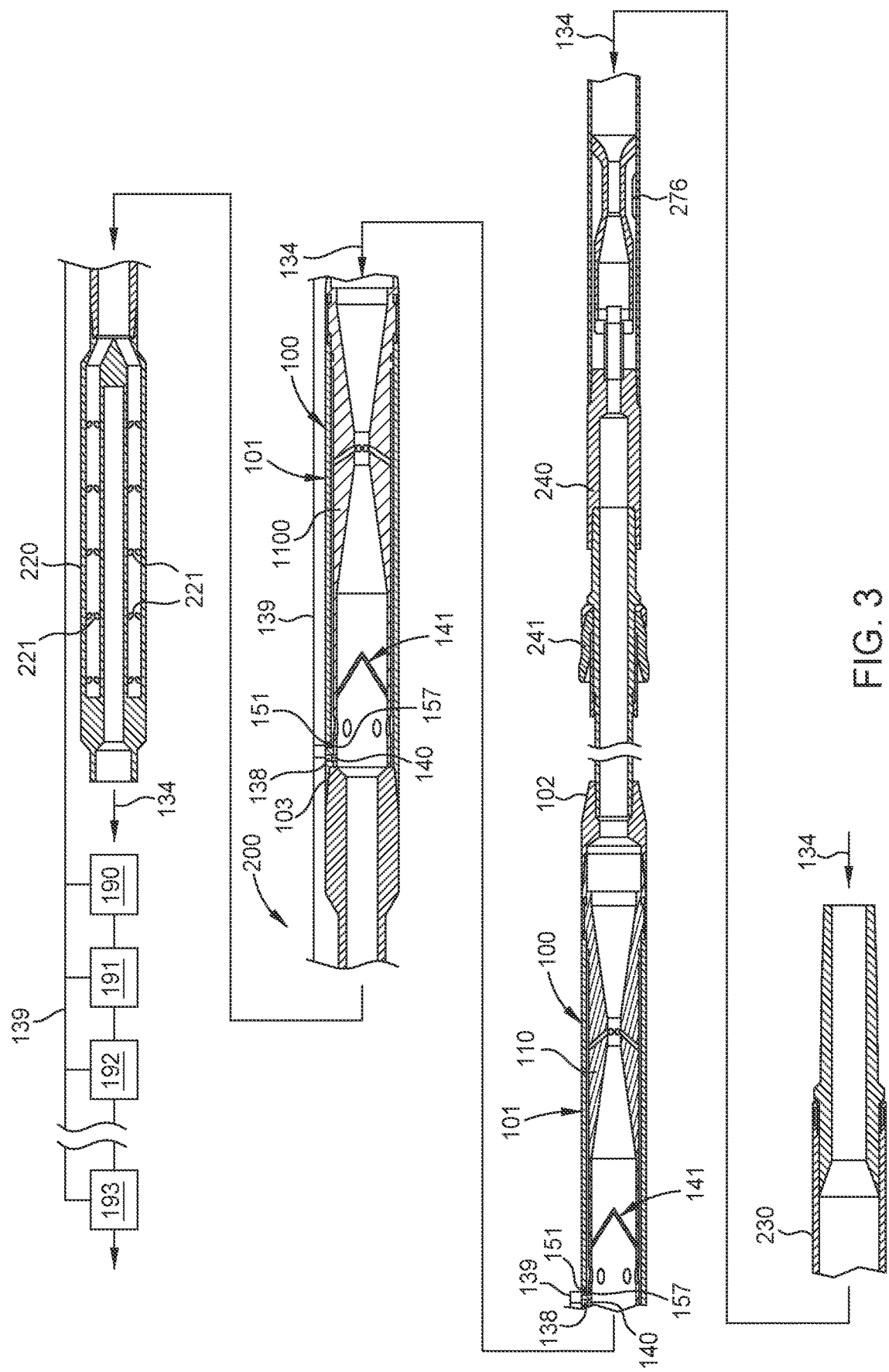
FIG. 3 is a schematic illustration of a system for regulating a multi-phase fluid stream flowing from a subterranean geological formation, according to one implementation.

FIG. 3 is a schematic illustration of a system 200 for regulating a multi-phase fluid stream flowing from a subterranean geological formation, according to one implementation. The system 200 includes the regulator apparatus 100 described above and illustrated in FIGS. 1A-1C and FIG. 2. The regulator apparatus 100 is fluidly connected to the pump 190 described above. The pump 190 is positioned downstream from the regulator apparatus 100.

The system 200 includes a first phase separator 220 fluidly connected to the regulator apparatus 100 and positioned downstream of the regulator apparatus 100 and upstream of the pump 190. The first phase separator 220 is fluidly connected via a threaded connection to the pump 190 and the regulator apparatus 100, and is positioned between the pump 190 and the regulator apparatus 100. The first phase separator 220 is sized and configured to separate at least a portion of a gas from the fluid stream 134. For example, the first phase separator 220 can be a gravity type separating device configured to force fluid out of the separating device to permit lighter fluids (e.g., gas) to travel to the surface. The first phase separator 220 may be a reverse flow gas separator. In one example, the first phase separator 220 has a diameter that is as large as can be accommodated by the well casing to permit adequate spacing and flow passage, which promotes annular gravity separation as the fluid stream flows from inside to the outside of the first phase separator 220 through one or more angled flow ports 221 in the body of the first phase separator 220. The one or more angled flow ports 221 are positioned at about a 45 degree angle, relative to an axial centerline of the first phase separator 220. The first phase separator 220 can include one or more fluid intake paths (e.g., tubing or piping conduits) to the pump 210.

The first phase separator 220 can include one or more lips located on the exterior body of the first phase separator. The one or more lips are positioned at an upward angle relative to the axial centerline of the first phase separator 220 to create a more torturous path for the fluid stream 134 flowing through the first phase separator 220, as well as a more conducive environment for gravity separation of a portion of the gas from the fluid stream. In one example, the one or more lips have an upward angle of about 60 degrees relative to the axial centerline of the first phase separator 220. Suitable types of separators that can be employed as the first phase separator 220 include without limitation an inverted Y-tool.

The system 200 includes a second phase separator 230 fluidly connected to the regulator apparatus 100, and positioned upstream of the first restriction 110 of the regulator apparatus 100. The second phase separator 230 is sized and configured to separate at least a portion of solid materials from the fluid stream 134. Suitable types of separators that can be employed as the second phase separator 230 include without limitation a sand separator. The system 200 includes additional downhole equipment, piping, and tubing such as cup packers 241 and/or centralizers. The system 200 includes a cup packer assembly 240 having two cup packers (such as cup packer 241) and a centralizer.

The cup packer assembly 240 is fluidly connected to the regulator apparatus 100, and positioned upstream from the regulator apparatus 100. Upstream of the cup packer assembly 240, the system 200 includes the second phase separator 230 fluidly connected to the cup packer assembly 240 (e.g., by threaded attachment). The second phase separator 230 is fluidly connected to a predetermined length of production tubing or piping, which is capped on the end. The function of the production tubing or piping is to collect the solid materials separated from the fluid stream 134 by the second phase separator 230 (e.g., sand or other solid materials) by the centrifugal actions of the operation of the second phase separator 230. The collection is accomplished via the gravity effect of the solid materials while suspended in the wellbore fluid solutions. The second phase separator 230 includes a fluid intake 276.

The present disclosure contemplates a method of using the apparatus or systems described above. In operation, a regulator apparatus 100 as described above, or a system 200 having a regulator apparatus 100 as described above, is placed within a wellbore conduit defined by a wellbore. The fluid stream 134 from a subterranean geological formation flows into and through the regulator apparatus 100 or system 200. As the fluid stream 134 flows through the regulator apparatus 100 or system 200, the gas volume fraction of the fluid stream 134 is reduced to a level such that the pump 190 can accommodate the fluid stream 134 with a reduced or eliminated probability of experiencing gas lock. The pump passes the fluid stream 134 towards the ground surface. For example, if the gas volume fraction of the fluid stream is about 0.9 as it enters the regulator apparatus 100 or system 200, then after flowing through the regulator apparatus 100 or system the gas volume fraction of the fluid stream is reduced to less than about 0.4, such as less than about 0.3. The gas volume fraction of the fluid stream 134 flowing from the regulator apparatus 100 or system 200 is reduced to an amount that prevents or reduces the likelihood of a pump positioned downstream from the regulator apparatus 100 experiencing gas locking.

The aspects of the regulator apparatus 100 facilitate mixing of fluid flowing through the first return path 120 with the fluid stream 134 flowing through the first restriction 110. The aspects of the regulator apparatus 100 facilitate reducing a gas volume fraction of the fluid stream 134 without drawing power from a source, such as the pump 190. Hence, the pump 190 can operate without parasitic drag from the regulator apparatus 100.

Benefits of the present disclosure include facilitating reducing a gas volume fraction of an oil and gas fluid stream flowing from a subterranean formation; reducing buildup of gas and/or formation of gas pockets in production equipment; reducing or eliminating the probability of gas lock of equipment, such as one or more pumps; and achieving such benefits without parasitic drag on one or more pumps.

Aspects of the present disclosure include a regulator apparatus for regulating a multi-phase fluid stream flowing from a subterranean geological formation; a gas siphon port; a gas siphon path; one or more valves; a diverter that directs at least a portion of a fluid stream radially outward; a return outlet of a return path having one or more ports disposed at a first angle relative to a first reference plane; a return inlet of a return path having one or more ports disposed at a second angle relative to a second reference plane; one or more return path restrictions; a return outlet that angles radially outwards in a downstream direction; and a return inlet that angles radially inwards in a downstream direction. It is contemplated that one or more of these aspects disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A method of regulating a fluid stream flowing from a subterranean geological formation, comprising:
    flowing the fluid stream into an apparatus positioned within a wellbore and along a primary flow path;
    siphoning at least part of the fluid stream from the primary flow path and through one or more valves positioned in a gas siphon port;
    flowing the fluid stream through a first restriction having a throat portion;
    flowing a portion of the fluid stream into a first return path;

returning the portion of the fluid stream through the first restriction and into the throat portion to mix the portion with portions of the fluid stream flowing through the throat portion along the primary flow path; and flowing the fluid stream toward a pump.

2. The method of claim 1, wherein the pump is positioned downstream of a return inlet of the first return path along the primary flow path.

3. The method of claim 1, wherein the fluid stream flows into the apparatus at a first gas volume fraction, and the fluid stream flows toward the pump at a second gas volume fraction that is that less than the first gas volume fraction.

4. The method of claim 3, wherein the first gas volume fraction is greater than 0.4 and the second gas volume fraction is 0.4 or less.

5. The method of claim 1, further comprising siphoning at least part of the portion of the fluid stream from the first return path and through one or more additional valves positioned in an additional gas siphon port.

6. The method of claim 1, wherein the returning of the portion of the fluid stream through the first restriction and into the throat portion comprises:

flowing the portion of the fluid stream through one or more ports disposed within the first restriction and tangentially to a centerline axis of the primary flow path.

7. The method of claim 1, further comprising:

flowing the fluid stream at least partially about a diverter positioned in the primary flow path.

8. The method of claim 7, wherein the flowing the fluid stream at least partially about the diverter comprises flowing the fluid stream about an apex of the diverter that points in an upstream direction from a return inlet of the first return path to a return outlet of the first return path.

9. The method of claim 7, further comprising:

flowing the fluid stream through one or more flow openings formed in the diverter.

10. The method of claim 9, wherein the flowing of the fluid stream at least partially about the diverter and through the one or more flow openings formed in the diverter is conducted prior to the flowing of the portion of the fluid stream into the first return path.

11. The method of claim 7, wherein the apparatus comprises a conduit, and the conduit comprises the first restriction.

12. A method of regulating a fluid stream flowing from a subterranean geological formation, comprising:

flowing the fluid stream into an apparatus positioned within a wellbore and along a primary flow path, the primary flow path having a centerline axis that defines a first reference plane that projects radially from the centerline axis;

flowing the fluid stream through a first restriction having a throat portion;

flowing a portion of the fluid stream into a return inlet of a first return path;

returning the portion of the fluid stream through the return inlet, through the first return path, through a return outlet of the first return path, and through the first restriction and into the throat portion to mix the portion with portions of the fluid stream flowing through the throat portion along the primary flow path, wherein the portion of the fluid stream is returned through one or more ports of the return outlet at a first angle relative to the first reference plane;

siphoning at least part of the fluid stream from the primary flow path or at least part of the portion of the fluid stream from the first return path and through one or more valves positioned in a gas siphon port; and flowing the fluid stream toward a pump.

13. The method of claim 12, wherein the first angle is within a range of 30 degrees to 80 degrees.

14. The method of claim 12, wherein the first angle is within a range of 0 degrees to 10 degrees, and the portion of the fluid stream is returned through the one or more ports tangentially to the centerline axis of the primary flow path.

15. The method of claim 12, wherein the portion of the fluid stream is returned through one or more ports of the return inlet at a second angle relative to a second reference plane that projects radially from the centerline axis of the primary flow path.

16. The method of claim 15, wherein the portion of the fluid stream returned through the one or more ports of the return outlet is returned radially inwards in an upstream direction from the return inlet to the return outlet, and the portion of the fluid stream returned through the one or more ports of the return inlet is returned radially outwards in the upstream direction.

17. The method of claim 12, wherein the portion of the fluid stream returned through the one or more ports of the return outlet flows about one or more return path restrictions positioned in the one or more ports of the return outlet.

18. The method of claim 12, wherein the apparatus comprises a conduit, and the conduit comprises the first restriction.

19. An apparatus for regulating a fluid stream flowing from a subterranean geological formation, comprising:

a conduit, the conduit comprising an outer wall, a primary flow path for the fluid stream, and a first restriction having a throat portion;

a first return path comprising:
 a return inlet,
 a return outlet positioned upstream of the return inlet and disposed within the first restriction at the throat portion, and
 a return channel, the return channel being fluidly connected to the primary flow path through the return inlet and the return outlet; and a gas siphon port formed in the outer wall of the conduit, the gas siphon port including a valve movable between an open position and a closed position, wherein in the open position a portion of the fluid stream flows out through a gas siphon path extending from the conduit, the gas siphon path being fluidly connected to the gas siphon port.

20. A method of regulating a fluid stream flowing from a subterranean geological formation, comprising:

flowing the fluid stream into an apparatus positioned within a wellbore and along a primary flow path;

flowing the fluid stream through a first restriction having a throat portion;

flowing a portion of the fluid stream into a first return path;

returning the portion of the fluid stream through the first restriction and into the throat portion to mix the portion with portions of the fluid stream flowing through the throat portion along the primary flow path;

siphoning at least part of the portion of the fluid stream from the first return path and through one or more valves positioned in a gas siphon port; and flowing the fluid stream toward a pump.

21. A method of regulating a fluid stream flowing from a subterranean geological formation, comprising:

flowing the fluid stream into an apparatus positioned within a wellbore and along a primary flow path;

flowing the fluid stream at least partially about a diverter positioned in the primary flow path, wherein the flowing the fluid stream at least partially about the diverter comprises flowing the fluid stream about an apex of the diverter that points in an upstream direction from a return inlet of the first return path to a return outlet of the first return path;

flowing the fluid stream through a first restriction having a throat portion;

flowing a portion of the fluid stream into a first return path;

returning the portion of the fluid stream through the first restriction and into the throat portion to mix the portion with portions of the fluid stream flowing through the throat portion along the primary flow path; and flowing the fluid stream toward a pump.

* * * * *